United States Patent
Faniuolo et al.

(10) Patent No.: US 9,591,521 B2
(45) Date of Patent: Mar. 7, 2017

(54) METHOD OF TRANSMISSION, USER EQUIPMENT AND NETWORK EQUIPMENT

(75) Inventors: Antonella Faniuolo, Westlea Swindon (GB); Tao Yang, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 394 days.

(21) Appl. No.: 12/811,870

(22) PCT Filed: Jan. 7, 2008

(86) PCT No.: PCT/CN2008/000044
§ 371 (c)(1),
(2), (4) Date: Jul. 7, 2010

(87) PCT Pub. No.: WO2009/086696
PCT Pub. Date: Jul. 16, 2009

(65) Prior Publication Data
US 2010/0278176 A1    Nov. 4, 2010

(51) Int. Cl.
*G06F 13/12*   (2006.01)
*H04W 28/06*   (2009.01)
(Continued)

(52) U.S. Cl.
CPC ............ *H04W 28/06* (2013.01); *H04L 47/35* (2013.01); *H04L 69/22* (2013.01); *H04W 80/02* (2013.01)

(58) Field of Classification Search
CPC ........... H04W 72/0413; H04W 72/042; H04W 74/0833
(Continued)

(56) References Cited

U.S. PATENT DOCUMENTS 6,683,866 B1 *   1/2004   Stanwood et al. ............. 370/350
7,349,434 B2 *   3/2008   Kim et al. ..................... 370/469
(Continued)

FOREIGN PATENT DOCUMENTS

CN   1604685 A    4/2005
EP   1610522 A1   12/2005
(Continued)

OTHER PUBLICATIONS

International Search Report for PCT/CN2008/000044.
(Continued)

*Primary Examiner* — Titus Wong
(74) *Attorney, Agent, or Firm* — Fay Sharpe, LLP

(57) ABSTRACT

A method of transmitting a message between user equipment and network equipment, user equipment and network equipment are disclosed. The method of transmitting a message between user equipment and network equipment in which the message comprises a message header and a message payload, the message header having a plurality of fields, comprises the steps of: setting an indicator field in the message header to indicate that a report providing scheduling information is included in the message payload; setting a secondary indicator field in the message header to indicate that, for at least some values of the secondary indicator field, an alternative report having alternative scheduling information is included in the message payload; and transmitting the message header and message payload. This enables alternative reports to be transmitted from the user equipment without reducing the number of allocatable logical channels or MAC CE types.

10 Claims, 4 Drawing Sheets

(51) Int. Cl.
 *H04L 12/801* (2013.01)
 *H04L 29/06* (2006.01)
 *H04W 80/02* (2009.01)
(58) Field of Classification Search
 USPC .......................................................... 710/62
 See application file for complete search history.

(56) References Cited

U.S. PATENT DOCUMENTS

| | | | |
|---|---|---|---|
| 2004/0006771 A1* | 1/2004 | Dale et al. .................... | 725/111 |
| 2004/0218534 A1* | 11/2004 | Song et al. ................. | 370/236.2 |
| 2007/0189332 A1 | 8/2007 | Phan et al. | |
| 2007/0298799 A1 | 12/2007 | Molkdar et al. | |
| 2008/0095185 A1* | 4/2008 | DiGirolamo et al. ........ | 370/464 |

FOREIGN PATENT DOCUMENTS

| | | |
|---|---|---|
| KR | 10-2007-0086299 | 8/2007 |
| WO | WO 2005/067262 | 7/2005 |
| WO | WO 2006/052085 | 5/2006 |
| WO | WO 2006/121262 | 11/2006 |

OTHER PUBLICATIONS

Alcatel-Lucent: "Structure of Buffer Status Report (R2-074885)", 3GPP TSG RAN WG2 #60, Nov. 5-9, 2007, pp. 1-3, XP002670785, Jeju, Korea.

"3GPP TS 36.321: Technical Specification Group Radio Access Network; Evolved Universal Terrestrial Radio Access (E-UTRA) Medium Access Control (MAC) protocol specification (Release 8)", No. V8.0.0, Dec. 2007, pp. 1-21.

European Search Report dated Mar. 6, 2012.

LG Electroncis Inc., "Discussion on Scheduling Request", R2-074245, 3GPP TSG-RAN WG2 #59bis, Oct. 8-12, 2007, Shanghai, China.

* cited by examiner

METHOD OF TRANSMISSION, USER EQUIPMENT AND NETWORK EQUIPMENT

FIELD OF THE INVENTION

The present invention relates to a method of transmitting a message between user equipment and network equipment, user equipment and network equipment.

BACKGROUND OF THE INVENTION

In a third generation (3G) evolved universal terrestrial radio access network (E-UTRAN) telecommunications system (as described in 3GPP specifications), a number of E-UTRAN NodeBs (eNBs) are arranged to communicate with a number of user equipment (UEs). A number of channels are provided between the eNBs and UEs to support this communication. On a downlink shared channel (DL-SCH) and an uplink shared channel (UL-SCH) information is multiplexed to enable transmission of control and traffic information between an eNB and a UE. The DL-SCH and UL-SCH carry a number of logical channels to enable a number of different applications on the UE associated with those channels to each transmit and receive control and traffic information over that channel. Accordingly, information to be transmitted over the UL-SCH is formed into a medium access control protocol data unit (MAC PDU) which consists of a MAC header and a MAC payload, as illustrated in FIG. 1. The MAC header provides information on the content of the MAC payload. The MAC payload comprises a number of MAC service data units (MAC SDUs), a number of MAC control elements (MAC CEs), together with optional padding. The MAC header comprises one or more MAC PDU sub-headers with each sub-header corresponding to either a MAC SDU, a MAC CE or padding. A MAC PDU sub-header associated with a MAC SDU, and MAC CE or padding consists of a logical channel identifier (LCID), together with other header information, such as an extension field (E), reserved bits (R), and, optionally, a format field (F) and a length field (L). The MAC PDU sub-headers, MAC SDUs, MAC CEs and padding are concatenated to create the MAC PDU. MAC CEs are placed before any MAC SDU, and padding occurs at the end of the MAC PDU. Both the MAC header and the MAC SDUs may have variable size. A maximum of one MAC PDU is then transmitted per transport block per user equipment.

As required, information such as a buffer status report is transmitted from the UE over the UL-SCH. Accordingly, a unique value of LCID ("11101") has been specifically allocated to identify such short buffer status reports (SBSR) within the MAC PDU. Similarly, in order to provide for a long buffer status report (LBSR), a further unique value of LCID ("11110") has been allocated to identify such reports within the MAC PDU. The SBSR provides information on the size of a buffer group within the UE and is provided as a MAC CE which includes the buffer size information, together an identifier (LCG ID) which identifies the buffer group to which the buffer size information relates. The LBSR provides information on the size of every buffer group within the UE and is provided as a MAC CE which includes the buffer size information for each buffer group. This information is used by the eNB when scheduling transmissions to the UE.

It is desired to provide for improved scheduling to the UEs.

SUMMARY OF THE INVENTION

According to a first aspect of the present invention, there is provided a method of transmitting a message between user equipment and network equipment, the message comprising a message header and a message payload, the message header having a plurality of fields, the method comprising the steps of: setting an indicator field in the message header to indicate that a report providing scheduling information is included in the message payload; setting a secondary indicator field in the message header to indicate that, for at least some values of the secondary indicator field, an alternative report having alternative scheduling information is included in the message payload; and transmitting the message header and message payload.

The first aspect recognises that in order to further improve scheduling, further alternative reports need to be provided to the eNBs. However, in order to add these alternative reports, further unique values of, for example, LCID would need to be assigned to each of those alternative reports. A problem with allocating further unique values of LCID to those further alternative reports is that the number of such allocations increases the number of uniquely assigned LCIDs which in turn reduces the number of allocatable logical channels and MAC CE types between the eNBs and UEs. However, the first aspect also recognises that, for example, the MAC sub-header contains two presently reserved bits which are included purely to ensure byte alignment of the sub-header. Accordingly, rather than allocating further unique LCIDs for each further alternative report, a secondary indicator field, such as one or more the reserved bits, is utilised to indicate that for at least some of the values of those bits, an alternative report is included in the associated message payload. It will be appreciated that this enables further reports to be transmitted from the UE without further reducing the number of allocatable logical channels or MAC CE types.

In one embodiment, for at least one value of the secondary indicator field, the alternative report comprises only the alternative scheduling information. Accordingly, when, for example, the LCID indicates that a buffer status report is present and the reserved bits are set to a particular predetermined value this may indicate that no buffer status report is present in the message payload and instead there is only an alternative report containing only the alternative scheduling information. This enables the alternative report to be transmitted in place of the buffer status report.

In one embodiment, for at least one value of the secondary indicator field, the alternative report comprises both the scheduling information and the alternative scheduling information. Accordingly, when, for example, the LCID value indicates that a buffer status report is present and the reserved bits have another predetermined value, this indicates that both the buffer status report and the modified status report are included in the message payload. This enables both the modified status report and the buffer status report to be included in a single message, rather than having to transmit two separate messages. It will be appreciated that this reduces message overhead.

In one embodiment, for at least one value of the secondary indicator field, no alternative report is included in the message payload. Accordingly, when the LCID indicates that a buffer status report is present and the reserved bits are set to yet another predetermined value, this indicates that only the associated buffer status report is present in the payload.

In one embodiment, the report provides an indication of buffer status of the user equipment. Typically, the buffer status report is either a short buffer status report whose content includes the buffer group identifier, together with an indication of the buffer size of that buffer group or a long buffer status report which indicates the buffer size of every buffer group.

In one embodiment, the alternative report provides an indication of alternative scheduling information related to the user equipment. Hence, any other information relating to the user equipment which is useful to the eNB for scheduling purposes may be provided within the alternative report.

In one embodiment, the alternative scheduling information comprises at least one of power headroom, path loss, a channel quality indication and differential path loss between the network element and the user equipment.

In one embodiment, the message comprises a medium access control protocol data unit in which the header comprises a medium access control header having a logical channel identifier as the indicator field and other bits within the medium access control header as the secondary indicator field, and in which the payload comprises a medium access control element including at least one of the report and the alternative report.

In one embodiment, the network equipment is an evolved universal terrestrial radio access network node B and the message is transmitted over an uplink shared channel.

According to a second aspect of the present invention, there is provided user equipment for transmitting a message to network equipment, the message comprising a message header and a message payload, the message header having a plurality of fields, the user equipment comprising: setting means operable to set an indicator field in the message header to indicate that a report providing scheduling information is included in the message payload and to set a secondary indicator field in the message header to indicate that for at least some values of the secondary indicator field an alternative report having alternative scheduling information is included in the message payload; and transmitting means operable to transmit the message header and message payload.

In one embodiment, the setting means is operable to set the secondary indicator field to at least one value which indicates that the alternative report comprises only the alternative scheduling information.

In one embodiment, the setting means is operable to set the secondary indicator field to at least one value which indicates that the alternative report comprises both the scheduling information and the alternative scheduling information.

In one embodiment, the setting means is operable to set the secondary indicator field to at least one value which indicates that no alternative report is included in the message payload.

In one embodiment, the report provides an indication of buffer status of the user equipment.

In one embodiment, the alternative report provides an indication of alternative scheduling information related to the user equipment.

In one embodiment, the alternative scheduling information comprises at least one of power headroom, path loss, a channel quality indication and differential path loss between the network element and the user equipment.

In one embodiment, the message comprises a medium access control protocol data unit in which the header comprises a medium access control header having a logical channel identifier as the indicator field and other bits within the medium access control header as the secondary indicator field, and in which the payload comprises a medium access control element including at least one of the report and the alternative report.

According to a third aspect of the present invention, there is provided network equipment for receiving a message, the message comprising a message header and a message payload, the message header having a plurality of fields, the network equipment comprising: decoding means operable to determine whether an indicator field in the message header and a secondary indicator field in the message header indicates that at least one of a report and an alternative report is included in the message payload; and extraction means operable to extract the message payload.

In one embodiment, the decoding means is operable to determine whether the secondary indicator field in the message header indicates that the alternative report comprises only the alternative scheduling information.

In one embodiment, the decoding means is operable to determine whether the secondary indicator field in the message header indicates that the alternative report comprises both the scheduling information and the alternative scheduling information.

In one embodiment, the decoding means is operable to determine whether the secondary indicator field in the message header indicates that no alternative report is included in the message payload.

In one embodiment, the report provides an indication of buffer status of the user equipment.

In one embodiment, the alternative report provides an indication of alternative scheduling information related to the user equipment.

In one embodiment, the alternative scheduling information comprises at least one of power headroom, path loss, a channel quality indication and differential path loss between the network element and the user equipment.

In one embodiment, the message comprises a medium access control protocol data unit in which the header comprises a medium access control header having a logical channel identifier as the indicator field and other bits within the medium access control header as the secondary indicator field, and in which the payload comprises a medium access control element including at least one of the report and the alternative report.

Further particular and preferred aspects of the present invention are set out in the accompanying independent and dependent claims. Features of the dependent claims may be combined with features of the independent claims as appropriate, and in combinations other than those explicitly set out in the claims.

BRIEF DESCRIPTION OF THE DRAWINGS

Embodiments of the present invention will be described further, with reference to the accompanying drawings, in which.

DESCRIPTION OF THE EMBODIMENTS

Figure 1:
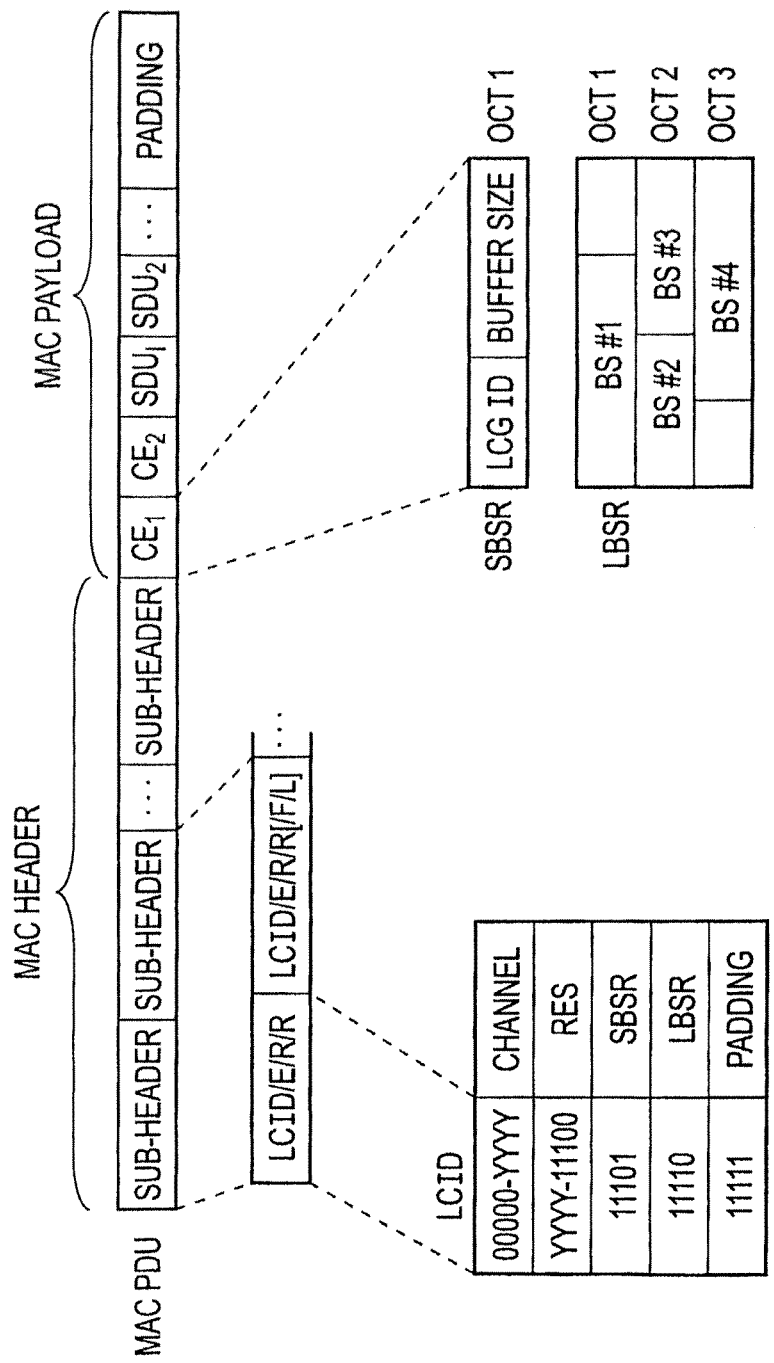
FIG. 1 illustrates a MAC PDU.
Figure 2:
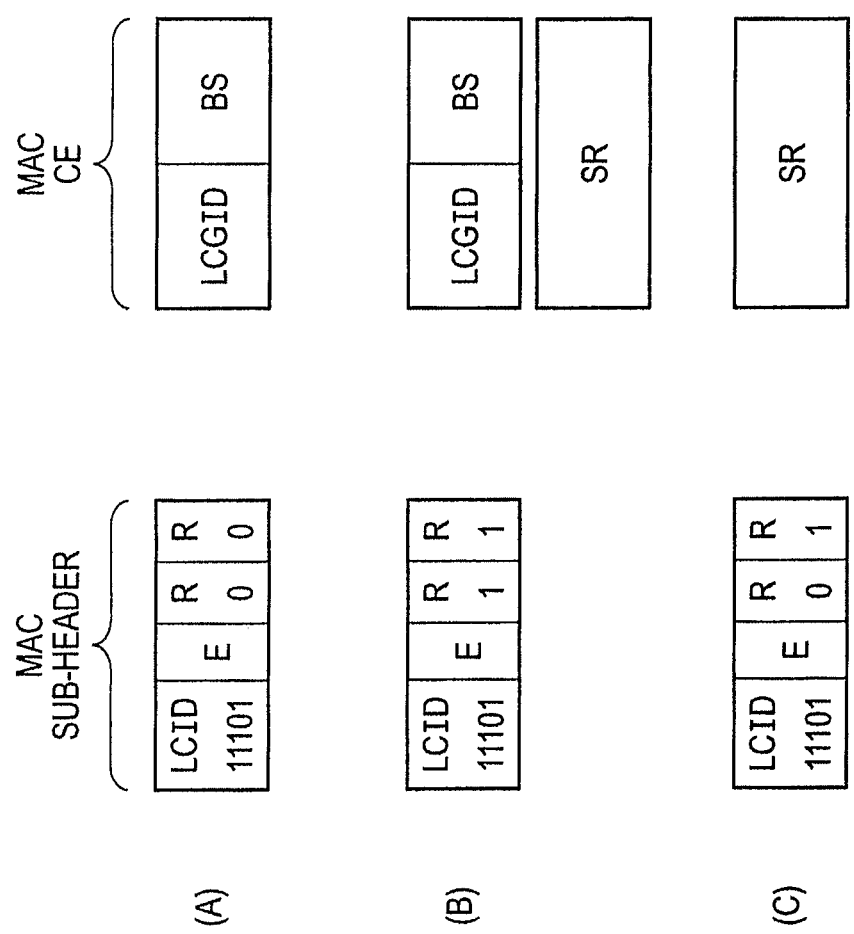
FIG. 2 illustrates a modified MAC PDU according to one embodiment.
Figure 4:
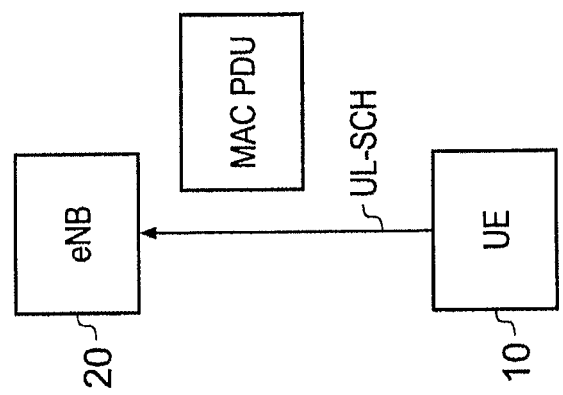
FIG. 4 illustrates interaction between an E-UTRAN NodeB and user equipment during a status event according to one embodiment.

FIG. 2 illustrates MAC sub-headers and MAC CEs according to one embodiment for inclusion into a MAC PDU for transmission over a UL-SCH between a UE 10 and an eNB 20 of a E-UTRAN telecommunications system, as shown in FIG. 4.

In the event that the UE 10 wishes to send a short buffer status report to the eNB 20 then, as illustrated in FIG. 2(A), the UE 10 sets the LCID in the MAC sub-header to "11101" to indicate that a short buffer status report is included in the associated MAC control element in the payload of the MAC PDU. The UE 10 also sets the two reserve bits to "00" to indicate to the eNB 20 that the control element only includes the short buffer status report. Accordingly, in the MAC CE, there is included the buffer logical group identifier, which identifies the particular buffer group whose status is being reported on, together with an indication of the buffer size.

At the eNB 20, upon receipt of the MAC PDU from the UE 10, the eNB 20 extracts the MAC sub-header and the associated MAC CE. The eNB 20 notes from the LCID and from the value of the reserve bits that the MAC CE only contains a short buffer status report. This information is then extracted for further utilisation by the eNB 20.

In the event that the UE 10 wishes to transmit both a short buffer status report and other scheduling information then, as illustrated in FIG. 2(B), the UE 10 sets the LCID field to "11101" and the two reserve bits to "11". In the MAC CE, the UE 10 includes both the short buffer status report and the further scheduling information.

At the eNB 20, the MAC sub-header and associated MAC CE are extracted. The eNB 20 determines from the LCID and the value of the reserve bits that both a short buffer status report and other scheduling information is included in the MAC CE. This information is then extracted for further utilisation by the eNB 20.

In the event that the UE 10 wishes to transmit only other scheduling information then, as illustrated in FIG. 2(C), the UE 10 sets the LCID field to "11101" and the two reserve bits to "01". In the MAC CE, the UE 10 includes only the further scheduling information.

At the eNB 20, the MAC sub-header and associated MAC CE are extracted. The eNB 20 determines from the LCID and the value of the reserve bits that only other scheduling information is included in the MAC CE. This information is then extracted for further utilisation by the eNB 20.

Figure 3:
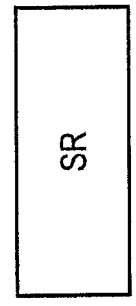
FIG. 3 illustrates a modified MAC PDU according to one embodiment.

In the event that the UE 10 wishes to send a long buffer status report to the eNB 20 then, as illustrated in FIG. 3(A), the UE 10 sets the LCID in the MAC sub-header to "11110" to indicate that a long buffer status report is included in the associated MAC control element in the payload of the MAC PDU. The UE 10 also sets the two reserve bits to "00" to indicate to the eNB 20 that the control element only includes the long buffer status report. Accordingly, in the MAC CE, there is included indication of the buffer sizes.

At the eNB 20, upon receipt of the MAC PDU from the UE 10, the eNB 20 extracts the MAC sub-header and the associated MAC CE. The eNB 20 notes from the LCID and from the value of the reserve bits that the MAC CE only contains a long buffer status report. This information is then extracted for further utilisation by the eNB 20.

In the event that the UE 10 wishes to transmit both a long buffer status report and other scheduling information then, as illustrated in FIG. 3(B), the UE 10 sets the LCID field to "11110" and the two reserve bits to "11". In the MAC CE, the UE 10 includes both the long buffer status report and the further scheduling information.

At the eNB 20, the MAC sub-header and associated MAC CE are extracted. The eNB 20 determines from the LCID and the value of the reserve bits that both a long buffer status report and other scheduling information is included in the MAC CE. This information is then extracted for further utilisation by the eNB 20.

By using the reserved bits in the header of the MAC CE defined for buffer status reporting it is possible to transmit the buffer status report alone, other scheduling information alone, or both the buffer status report and other scheduling information. Of course, fewer or more than both reserved bits may be used, although this changes the number of combinations of status reports which may be transmitted together.

Although the embodiments above have described sending example scheduling information one or more of power headroom, path loss, a channel quality indication and differential path loss, it will be appreciated that any other information useful to the eNB 20 for scheduling may be included.

Although particular bit combinations and associated MAC CE payloads have been illustrated, it will be appreciated that alternative bit combinations in the reserved bit field could be utilised to address MAC CE payloads in combinations other than that described.

It can be seen that embodiments of the present invention optimise the MAC SDU format to enable further scheduling information to be transmitted which reduces the overhead of some MAC messages and avoids the definition of LCID values to include the new scheduling information. This avoids additional overhead in those cases where both a buffer status report and other scheduling information need to be transmitted at the same time, which if further LCID values had been allocated, would necessitate the transmission of two separate MAC CEs.

In so far as the embodiments of the invention described above are implemented, at least in part, using software-controlled data processing apparatus, it will be appreciated that a computer program providing such software control and a storage medium by which such a computer program is stored are also envisaged as aspects of the present invention.

Although illustrative embodiments of the invention have been disclosed in detail herein, with reference to the accompanying drawings, it is understood that the invention is not limited to the precise embodiments and that various changes and modifications can be effected therein by one skilled in the art without departing from the scope of the invention as defined by the appended claims and their equivalents.

The invention claimed is:

1. A method of transmitting a message between user equipment and network equipment, the message comprising a message header and a message payload, wherein the message comprises a medium access control protocol data unit in which the message header comprises a medium access control sub-header having a logical channel identifier, an extension field, and one or more reserved bits, and in which the message payload comprises a medium access control element, the method comprising:
   setting an indicator field in the logical channel identifier to indicate that a report providing scheduling information is included in the medium access control element, wherein the report comprises a short buffer status report or a long buffer status report;

setting a secondary indicator field in the one or more reserved bits within the medium access control sub-header to indicate that, for at least some values of the secondary indicator field, an alternative report having alternative scheduling information is included in the medium access control element, wherein the alternative scheduling information comprises at least one of power headroom, path loss, a channel quality indication and differential path loss between the network equipment and the user equipment; and transmitting the message header and message payload.

2. The method of claim 1, wherein, for at least one value of the secondary indicator field, the alternative report comprises only the alternative scheduling information.

3. The method of claim 1, wherein, for at least one value of the secondary indicator field, the alternative report comprises both the scheduling information and the alternative scheduling information.

4. The method of claim 1, wherein for at least one value of the secondary indicator field, no alternative report is included in the message payload.

5. The method of claim 1, wherein the report provides an indication of buffer status of the user equipment.

6. The method of claim 1, wherein the alternative report provides an indication of alternative scheduling information related to the user equipment.

7. User equipment for transmitting a message to network equipment, the message comprising a message header and a message payload, wherein the message comprises a medium access control protocol data unit in which the message header comprises a medium access control sub-header having a logical channel identifier, an extension field, and one or more reserved bits, and in which the message payload comprises a medium access control element, the user equipment comprising:

a transmitter operable to transmit the message header and message payload, wherein the user equipment is operable to set an indicator field in the logical channel identifier to indicate that a report providing scheduling information is included in the medium access control element, wherein the report comprises a short buffer status report or a long buffer status report, wherein the user equipment is operable to set a secondary indicator field in the one or more reserved bits within the medium access control sub-header to indicate that for at least some values of the secondary indicator field an alternative report having alternative scheduling information is included in the medium access control element, wherein the alternative scheduling information comprises at least one of power headroom, path loss, a channel quality indication and differential path loss between the network equipment and the user equipment.

8. Network equipment for receiving a message, the message comprising a message header and a message payload, wherein the message comprises a medium access control protocol data unit in which the message header comprises a medium access control sub-header having a logical channel identifier, an extension field, and one or more reserved bits, and in which the message payload comprises a medium access control element, the network equipment comprising:

an extractor operable to extract the message payload; and a decoder operable to determine whether an indicator field is in the logical channel identifier to indicate that a report providing scheduling information is included in the medium access control element and to determine whether a secondary indicator field is in the one or more reserved bits within the medium access control sub-header to indicate that for at least some values of the secondary indicator field an alternative report having alternative scheduling information is included in the medium access control element, wherein the report comprises a short buffer status report or a long buffer status report and wherein the alternative scheduling information comprises at least one of power headroom, path loss, a channel quality indication and differential path loss between the network equipment and the user equipment.

9. The method of claim 1, further comprising:

decoding the message header to determine whether an indicator field in the message header and a secondary field in the message header indicate that at least one of a report and an alternative report is included in the message payload;

extracting the message payload from the message.

10. The method of claim 9, wherein the network equipment comprises an evolved universal terrestrial radio access network node B and the message is transmitted over an uplink shared channel.

* * * * *